(12) United States Patent
Bavor et al.

(10) Patent No.: US 7,730,223 B1
(45) Date of Patent: Jun. 1, 2010

(54) WIRELESS HOME AND OFFICE APPLIANCE MANAGEMENT AND INTEGRATION

(75) Inventors: Clay Bavor, Stanford, CA (US); Jesse Levinson, Stanford, CA (US)

(73) Assignee: Apple Inc., Cupertino, CA (US)

( * ) Notice: Subject to any disclaimer, the term of this patent is extended or adjusted under 35 U.S.C. 154(b) by 627 days.

(21) Appl. No.: 11/195,586

(22) Filed: Aug. 1, 2005

Related U.S. Application Data

(60) Provisional application No. 60/592,425, filed on Jul. 30, 2004.

(51) Int. Cl.
*G06F 3/00* (2006.01)
*G06F 15/173* (2006.01)

(52) U.S. Cl. ............................. 710/8; 710/15; 710/19; 709/223

(58) Field of Classification Search .............. 710/8
See application file for complete search history.

(56) References Cited

U.S. PATENT DOCUMENTS 6,330,618 B1* 12/2001 Hawkins et al. ............ 709/248
6,957,075 B1* 10/2005 Iverson ..................... 455/456.3
7,295,119 B2* 11/2007 Rappaport et al. .......... 340/572.4
7,469,139 B2* 12/2008 van de Groenendaal ..... 455/411
2004/0010561 A1* 1/2004 Kim et al. ................... 709/208
2005/0108320 A1* 5/2005 Lord et al. .................. 709/201

* cited by examiner

*Primary Examiner*—Niketa I Patel
*Assistant Examiner*—Zachary K Huson
(74) *Attorney, Agent, or Firm*—Fenwick & West LLP

(57) ABSTRACT

The present invention provides systems and methods for managing and controlling networked devices. A system comprises a host application executing on, for example, a personal computer, and one or more networked devices executing a client application. A networked device includes a consumer appliance equipped with network capability, a digital device such as MP3 players and DVRs, an electronically-controlled device such as a light circuit or other type of circuit, and the like. The host application automatically establishes communication with the networked device. The networked device configures a user interface for user control of the networked device. The host application provides a graphical layout of the networked device.

29 Claims, 14 Drawing Sheets

Drag a new picture into the well:
FIG. 9A
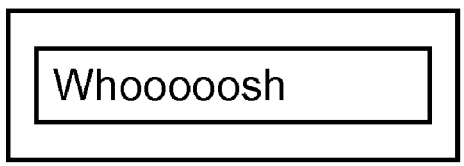
FIG. 9B
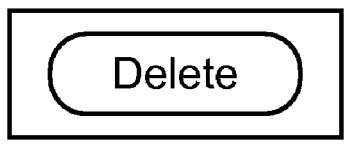
FIG. 9C
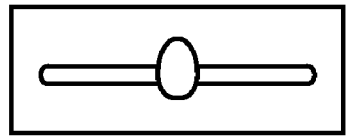
FIG. 9D

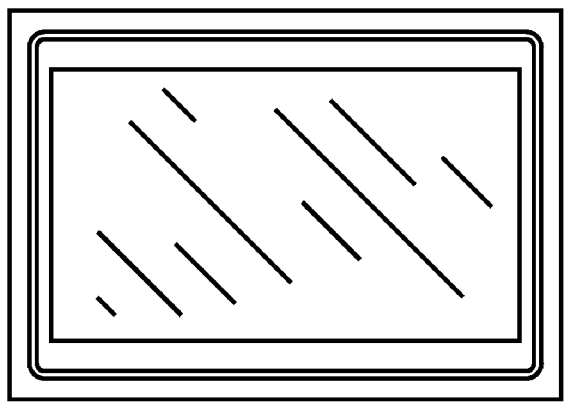
FIG. 9E
  Superimpose picture names
FIG. 9F
Psycho! ▲▼
FIG. 9G
Browse... | yellow.mp3 | (Clear)
FIG. 9H

WIRELESS HOME AND OFFICE APPLIANCE MANAGEMENT AND INTEGRATION

CROSS-REFERENCE TO RELATED APPLICATIONS

This patent application claims the benefit of U.S. Provisional Application 60/592,425, filed on Jul. 30, 2004, which is incorporated herein by reference in its entirety.

FIELD OF THE INVENTION

The present invention relates generally to software tools for management and configuration of networked devices.

BACKGROUND OF THE INVENTION

The number of appliances and other electronically-controlled devices in homes and businesses has drastically increased. These devices are typically controlled through a local control interface (e.g., buttons or remote controls). Because the devices have can have varying manufacturers and functionalities, their local control interfaces can also vary. For example, an oven can provide controls for temperature and cook time while a television can provide controls for channel selection and volume. Moreover, whereas a television adapted for use as in a sophisticated entertainment center can provide controls for aspect ratio and resolution, a television having an integrated DVD player can provide controls for DVD playback.

Present attempts to integrate and manage home and office appliances using a personal computer are typically directed to rudimentary solutions limited to the device and communication set-up and other low-level communications. Moreover, these attempts are typically vendor-specific, require hardware set ups of communication cables, and software configuration of drivers and application level controls. For example, the X10 technology allows users to control appliances by connecting the appliances to outlets on X10 appliance switching boxes which in turn connect to the wall electrical outlet. The computer can transmit messages to the X10 units with a series of power pulses in the household electrical wiring. However, the X10 technology suffers from serious reliability issues, can send only basic commands to appliances, has limited support for data transmission, and is difficult to set up and use. Software applications for managing X10 appliances are similarly unsophisticated in that the packages provide no intuitive icon- or graphics-based interfaces, make organizing appliances difficult. Also, because of X10's addressing system, the user is subjected to potentially confusing configuration details.

More recent technologies allow devices such as MP3 stereos and digital video recorders allow to be configured from their personal computer over an Ethernet network. Others devices can communicate via IEEE 802.11b, a wireless networking standard. Nikon offers a professional digital camera with an IEEE 802.11b transmitter for sending photos to a web server via FTP, and some printer manufacturers incorporate wireless chipsets in their products as well. These and similar technologies can require that a user install drivers and other software on the computer before using the device, and perform some setup related to establishing communications, sometimes involving hardware and IP addresses.

Technologies such as NetSense and UPnP lack sufficient support for various types of controls of devices. In particular, web interfaces using NetSense and UPnP suffer from the limitations of HTML forms, such as the lack of many desirable user interface widgets, including sliders, complex buttons, and drag-and-drop image and file wells.

Other technologies such as iReady, using Bluetooth as a communication medium, suffer from Bluetooth's well known limitations including an extremely short range, slow transfer speeds, and an inability to see and control all of one's appliances from one location.

Therefore, there is a need in the field of home automation for systems and methods for intuitive management of networked devices using, for example, graphical layouts, and there is a need for application level control without the need for user configuration of hardware and/or software.

SUMMARY OF THE INVENTION

The present invention provides systems and methods for managing and controlling networked devices. In one embodiment, a system comprises a host application executing on, for example, a personal computer, and one or more networked devices executing a client application. A networked device can include a consumer appliance equipped with network capability, a digital device such as MP3 players and DVRs, an electronically-controlled device such as a light circuit or other type of circuit, and the like.

The host application automatically establishes communication with the networked device. First, the networked device can automatically access a network (e.g., a wireless network having a DHCP service) on which it can broadcast a network address and service. The host application can sense the broadcast and automatically establish communication with the network appliance while registering the service for availability to a user.

In another embodiment, the networked device dynamically configures a user interface for user control of the networked device. To do so, the networked device can transmit user interface information that specifies components of a user interface. The user interface information can be structured in an open format. The components are related to application level control of the service provided by the network appliance. For example, the networked device can use XML to format name-value pairs, i.e., names of components and current values associated with the components (e.g., volume slider at 50%, titles of MP3s in a playlist). The host then generates the user interface from a component repository and sets values as indicated by the networked device. The user interface can also display components related to lower level control such as a state of the networked device (e.g., on, off, online, offline, error, and the like) or communications configuration (e.g., IP address, port, network connection, and the like).

In yet another embodiment, the host application provides a graphical layout of the networked device. Accordingly, the host application can display a floor plan or pictures of the environment containing the networked device (e.g., pictures of a room in a house or office). The networked device can be displayed as a representative icon, allowing the user to double click the icon for gaining access to the user interface.

Advantageously, the user can remotely control the networked devices from the personal computer with minimal set up and without regard to a specific operating system. In addition, the user interface has a consistent and recognizable format across different networked devices, but is nevertheless customized to capabilities of the networked device. Moreover, the graphical layout eases user management of multiple networked devices.

BRIEF DESCRIPTION OF THE DRAWINGS

FIGS. 9A-H are schematic diagrams illustrating examples of user interface components in accordance with one embodiment of the present invention.

FIGS. 10A-B are schematic diagrams of control interfaces for networked devices according to one embodiment of the present invention.

Figure 1:
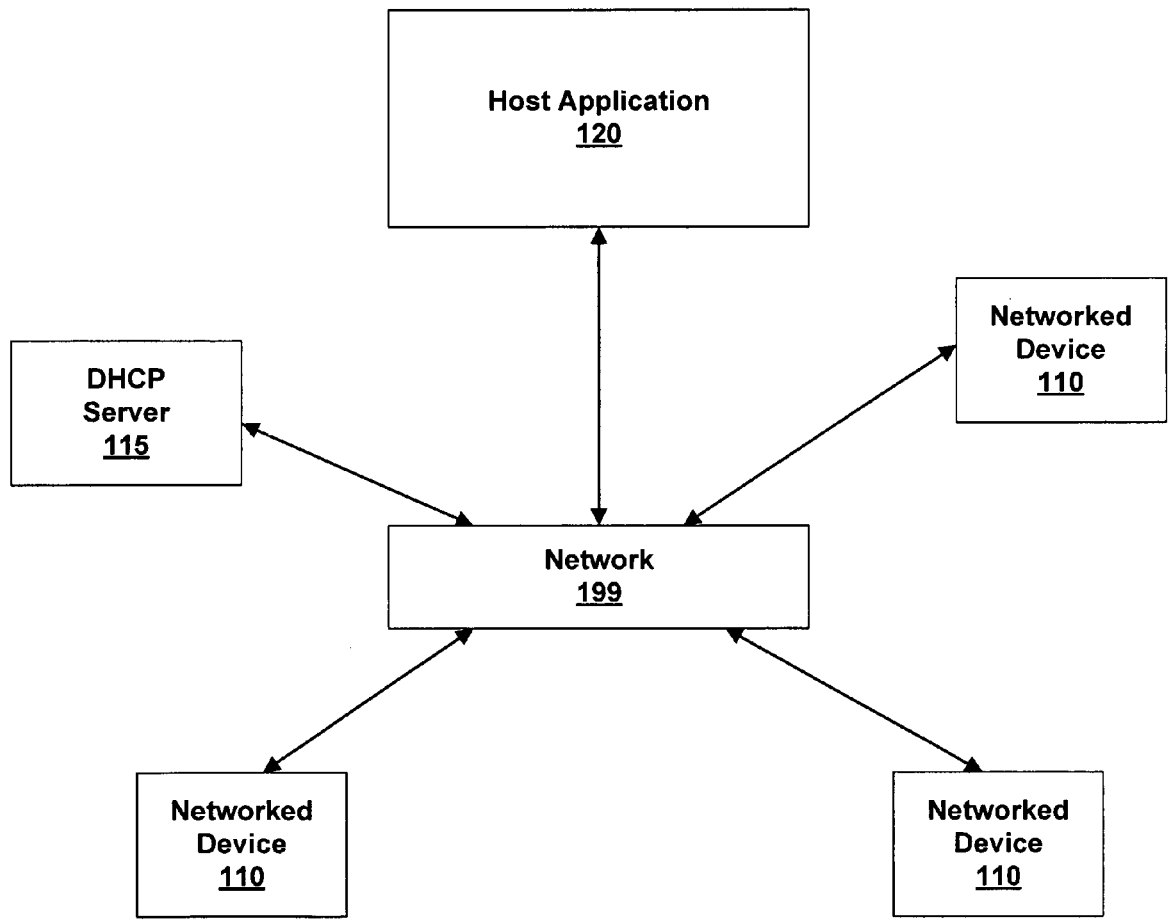
FIG. 1 is a block diagram illustrating a system for managing and controlling networked devices according to one embodiment of the present invention.

One skilled in the art will recognize that these Figures are merely examples of the operation of the invention according to one embodiment and that other user interface arrangements and modes of operation can be used without departing from the essential characteristics of the invention.

DETAILED DESCRIPTION OF THE PREFERRED EMBODIMENTS

The present invention provides systems and methods for managing and controlling networked devices. The present invention can be used in several scenarios including a home entertainment system, an automated home, or an automated business.

I. Typical Use Cases

In the home entertainment system, a user can install a variety of audio/video devices for a home theater, many of which come with complex and difficult to configure features. For example, the MP3 stereo system he wishes to install offers support for such advanced functionality as user-defined playlists and scheduling. The user can integrate setup and control of all of the home theater devices even though each device comes with its own remote control and/or piece of software for configuring it using a personal computer. In this scenario, the MP3 stereo system can discover and join a wireless network being provided by a wireless access point/base station. Using a personal computer connected to the same subnet (or remotely connected to the subnet) as the MP3 stereo via Ethernet cable or wireless card, the user can open a host application that automatically detects the presence of the MP3 stereo on his network. After the stereo is discovered by the application, the user can click a representative icon of the stereo to configure it. A stereo-specific user interface is loaded immediately, and the enthusiast proceeds to add music to the MP3 player by dragging a folder of recently downloaded MP3 music files from his desktop into, the appropriate portion of the MP3 stereo interface and clicking a button to upload the music files to the MP3 stereo. The data is transmitted over the wireless network, and is stored on the MP3 stereo for future use. The user can then use another portion of the stereo-specific interface to build play lists using the music files that he just uploaded.

In a home automation system, the user wants to have a hot tub on and ready for use on Thursday and Saturday nights, but has stopped using the hot tub altogether because the unlabelled, three button interface on the hot tub controller is confusing. Also, the user is burdened with spending hours before going on vacation setting up outlet auto timers before each vacation and another hour to remove when returning. In this scenario, the user installs a hot tub controller with support for the present invention. The hot tub controller automatically detects and joins the two-access-point wireless network already installed in the home. Before leaving for work Thursday, the user opens the host application on a personal computer away from the home. The software automatically detects the presence of the hot tub controller on the wireless network. Clicking a representative icon of the controller, the user brings up a user interface that includes settings for temperature, jets, lighting, and scheduling. The user inputs a request to turn on at 5 PM on Thursdays and Saturdays and then turn off at 11 PM those same days. After clicking a button that sets the controller settings, the new settings for the hot tub controller are sent to the controller via the wireless network, and the controller updates its settings with the new configuration.

In another home automation system for controlling a lighting system, a number of inexpensive wall boxes are plugged into an AC outlet and provide their own outlet that is controllable using the present invention. Using this intermediary switch allows the user to use existing antique lamps. The first time that the user plugs these devices in between lamps and AC outlets, the user interface opens on a laptop, which connects to the wireless network via a wireless networking card. All ten of the switching devices are automatically discovered, and the user is asked to specify the location of each one. The user then configures two modes for how the lights should behave, one for everyday use in which the switches are on during the day (and controllable from the lamp itself) but switch off at 11 PM, and a second mode for vacation, in which the ten switches turn the connected lamps on at random intervals around sunrise and would-be bedtime at 11 PM. Then, when the user goes on vacation, using a single command from the host application, the mode on each switch can be changed instantly.

In an office system, daily tasks are automated such as starting the coffee machine in the morning and the dishwasher in the evening. A dishwasher is adapted according to the present invention. A switching device can be a power outlet strip with an electrical output for receiving the electrical plug of the coffee machine, the power outlet strip controlling power to the outlet. The coffee machine is plugged into the switching device, which in turn is plugged into the wall outlet. Now, the user can use a PDA device executing the host application to set up all of the office devices to turn on and off at specific times. To configure, the user opens the host application and the devices are discovered automatically. The dishwasher identifies itself directly to the host application. The switching device also identifies itself, and the user associates this switching device with a label to show that it is controlling the coffee machine. The user can also set up appliance groups to facilitate messaging multiple appliances at once. For example, the user can set up an appliance group of all lights, and could automate the host application to turn off all lights on Friday. Each appliance will continue to operate on schedule because it has its own clock and CPU. That is, even if the user arrives late on Monday, the lights will be on and coffee will be ready.

II. System Architecture

FIG. 1 is a block diagram illustrating a system 100 for managing and controlling networked devices 110 according to one embodiment of the present invention. The system 100 comprises the networked devices 110, a DHCP server, and a host application 120, in communication through a network 199. Generally, the host application 120 provides a communication channel for a user with the networked devices 110.

A networked device 110 sends configuration information and user interface information to the host application 120. Also, the networked device receives input from a user via the host application 120. The networked device 110 can be, for example, a consumer appliance equipped with network capability, a digital device such as a personal computer, a media appliance such as an MP3 player or a DVR, an electronically-controlled device such as lighting circuits, and the like. The networked device 110 can include components such as a wireless chipset, a CPU, an operating system, a C or Java compiler, and the like.

The networked device 110 can automatically configure with the network 199 by leveraging protocols such as Zeroconf or UPnP to automatically resolve IP addresses. The networked device 110 can then send the configuration information to the host application 120. The configuration information can include an IP address, a unique identifier, a service offered by the networked device, and the like. Generally, Zeroconf is a protocol that facilitates the assignment of IP addresses using, for example, the DHCP server 115. The Zeroconf protocol is described in more detail in Zero Configuration Networking Internet-Draft dated Sep. 19, 2002, which is hereby incorporated by reference in its entirety. The UPnP protocol facilitates peer-to-peer communication between devices. The UPnP protocol is described in more detail in UPnP Device Architecture, version 1 dated June 2000, which is also hereby incorporated by reference in its entirety. The DHCP server 115 dynamically assigns a network address to the networked device 110 (e.g., an IP address).

In order to provide user control and management, the networked device 110 can provide the user interface information that describes a user interface including user interface components. The user interface components, examples of which are shown in FIGS. 9A-H, can be customized according to a service offered by the networked device 110. The user interface information can be name-value pairs (or keys) that list names and types of components to be included in a user interface along with associated values. The networked device 110 and user interfaces are described in more detail below. Likewise, methods for automatic configuration and user interface generation are described in more detail below.

The host application 120 receives the configuration information and the user interface information as described. In addition, the host application receives input from a user. The host application 120 can be, for example, an application software, a component of an operating system, a plug-in, a script, and the like. The host application 120 can execute on, for example, a personal computer, a laptop computer, a PDA, a digital remote control, and the like. The host application 120 can establish communication and register the networked devices 110 responsive to the configuration information. Moreover, the host application 120 can generate user interfaces responsive to the user interface information, allowing interactions with the user. An operating system such as Mac OSX by Apple Computer Corp. of Cupertino, Calif., Windows, UNIX, and the like, can be adapted to integrate the host application 120. As a result, the user interfaces can have a common look and feel with other user interfaces of the operating system, while being customized in accordance with a service offered by the networked devices 110. In one embodiment the host application 120 functions as a server that displays a user interface on a remotely connected device (e.g., allowing the user to interact from out-of-town or from a mobile device). The host application 120 is described in more detail below.

The network 199 provides the communication channel between the networked devices 110 and the host application 120. The network 199 can be wired and/or unwired using protocols such as IEEE 802.11, IEEE 802.3, and the like. In one embodiment, the network 199 uses TCP/IP for transporting packets. The network 199 can deliver packets between the networked devices 110 and the host application 120, as well as between the networked devices 110. In one embodiment, the network 199 is unsecured, allowing access to an unknown networked device 110.

Figure 2:
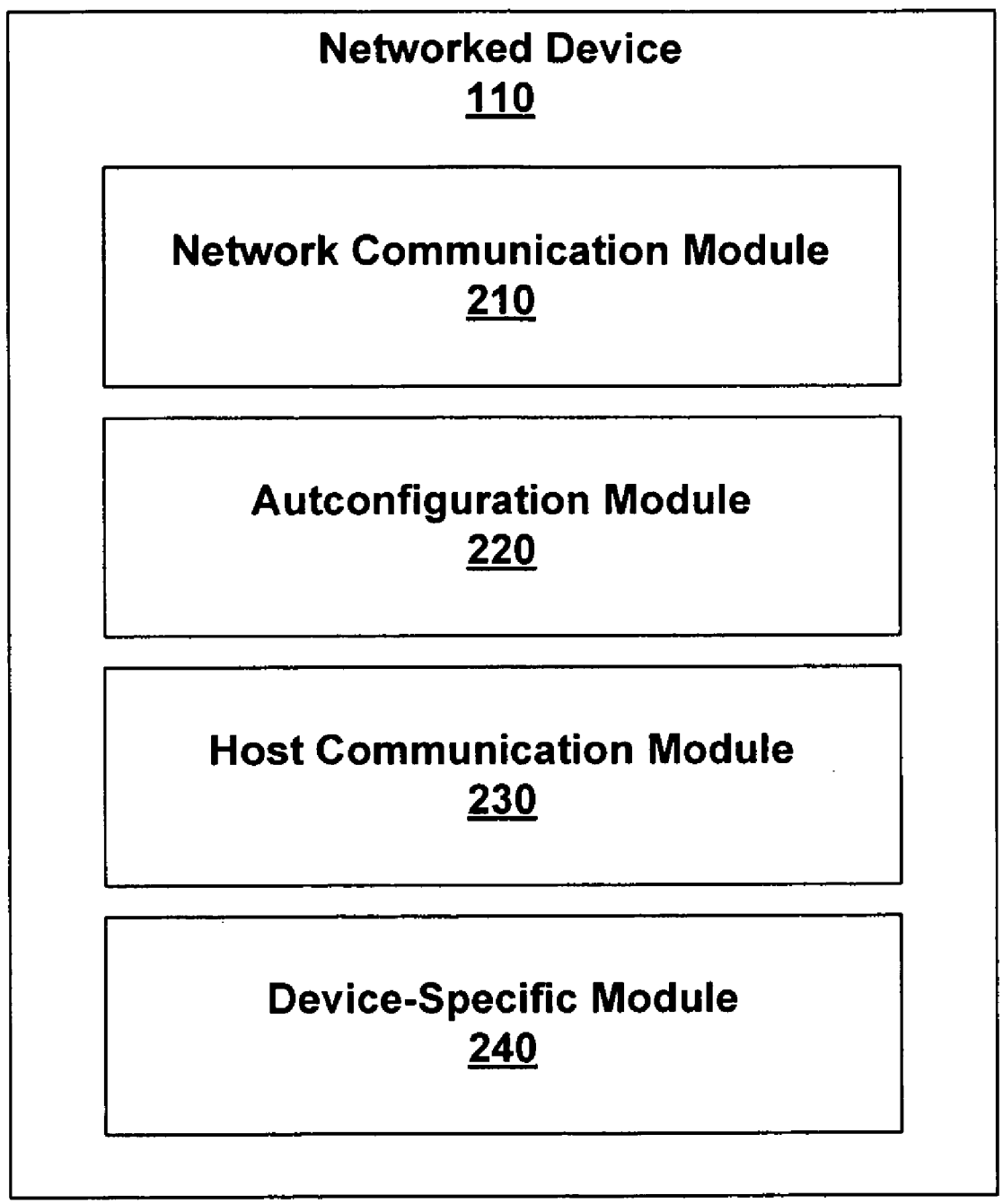
FIG. 2 is a block diagram illustrating a networked device according to one embodiment of the present invention.

FIG. 2 is a block diagram illustrating the networked device 110 of FIG. 1 according to one embodiment of the present invention. The networked device 110 comprises a network communication module 210, an autoconfiguration module 220, a host communication module 230, and a device-specific 240.

The network communication module 210 exchanges packets with network 199. The network communications module 210 can be implemented in hardware and/or software. In one embodiment, the communications module 210 comprises a wireless chipset including components such as an RF transceiver. The communications module 210 facilitates communications according to a protocol used by the network 199. For example, the communications module 210 can structure a data stream from higher level modules and applications into IP packets.

The autoconfiguration module 220 communicates with the DHCP server 115 and the host application 120. The autoconfiguration module 220 can implement, for example, Zeroconf or UPnP in order to obtain a dynamic IP address from the DHCP server 115. The autoconfiguration module 220 also broadcasts (or multicasts) the configuration information to the host application 120 which includes the IP address and a service of the networked device 110 as described above. Once communications are established with the host application 120, a host IP address can be stored in memory for future configurations.

The host communication module 230 communicates with the host application 120. The host communication module 230 structures data into a compatible format. In one embodiment, data is structured according to an open and ubiquitous format such as XML. By using XML, the host communications module 230 can use extensible features such as tags for controlling the presentation of data. For example, an XML file can be used to describe components of a user interface that is in turn presented to the user by the host application 120. In this way, the host communication module 120 uses name-value pairs as described above. In other embodiments, the host communication module 230 can use other formats such as HTML, Java, Flash, or PDF in order to structure presentation. In still other embodiments, the extensibility of XML is leveraged to incorporate additional protocols (e.g., use XML to support video streaming with the UDP protocol).

In still other embodiments, the host communication module 230 tracks (or determines) low-level configuration states and events associated with the networked device 110. Configuration states refer generally to conditions of the networked device 110 such as on, off, online, offline, ready, error, reset, and the like. Events can include a change between states. The states and events can be sent to the host application 120 and displayed for configuration by the user.

Figure 10A:
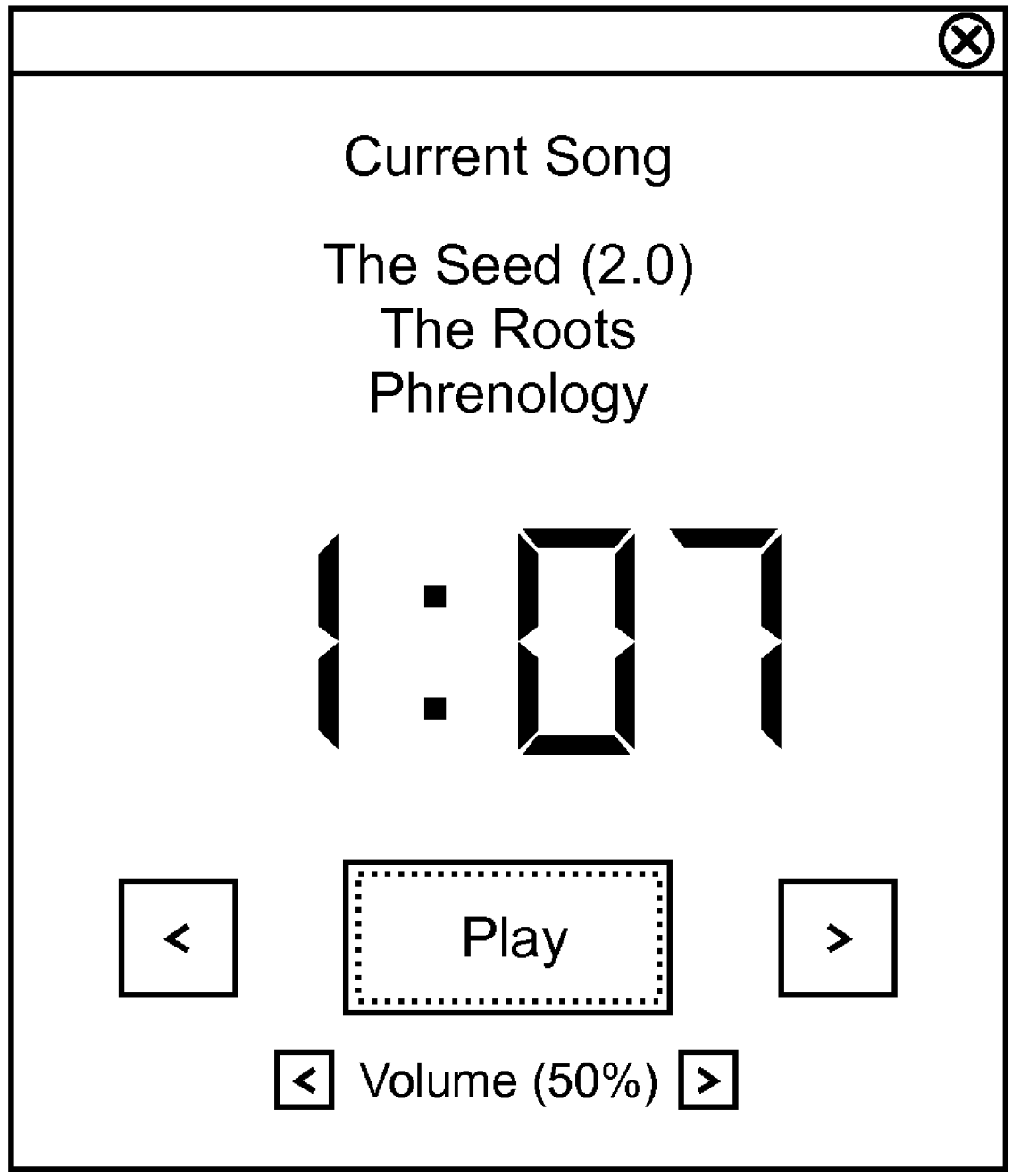

The device-specific module 240 communicates with the host application 120 using application-level commands. For networked devices 120 with embedded technology (e.g., a digital device), the application-level commands are instructions and data exchanges that are compatible with a format that is native to the networked device 110. More particularly, a button or control interface available directly on the networked appliance (e.g., a touch screen) for local control uses application-level commands without regard to networking as shown in FIG. 10A (e.g., electrical signal or digital information for powering up, changing contrast, dimming lights, etc.). Thus, the device-specific module 240 translates between the application-level commands and the name-value pairs. In another embodiment where the networked device 110 does not incorporate embedded technology (e.g., light circuit), the device-specific module 240 can control power to an outlet by using an LED circuit that triggers an amplifying circuit as shown in FIG. 10B.

Figure 3:
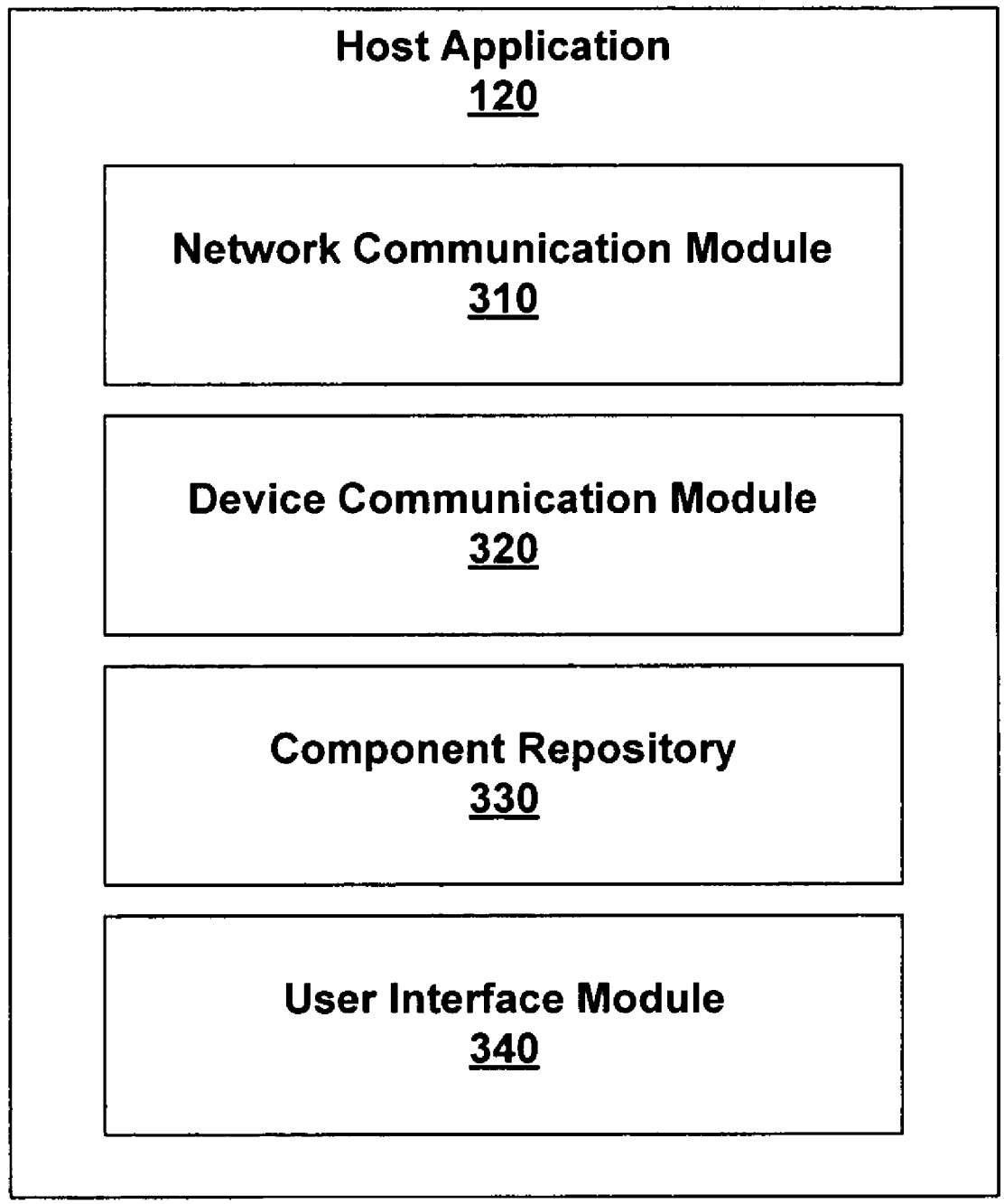
FIG. 3 is a block diagram illustrating a host application according to one embodiment of the present invention.

FIG. 3 is a block diagram illustrating the host application 120 of FIG. 1 according to one embodiment of the present invention. The host application 120 comprises a network communication module 310, a device communications module 320, a component repository 330, and a user interface module 340.

The network communications module 310 communicates with the communications module 210 of FIG. 2. The network communication module 310 can be similar to, and compatible with, the network communications module 210. The network communications module 310 can store a list of network addresses corresponding to each registered networked device 110.

The device communication module 320 communicates with the host communication module 230 as described above. The device communications module 320 can be similar to, and compatible with the host communications module 230. The device communication module 320 receives user interface information (e.g., an XML file). In one embodiment, in response to input from a user, the device communication module 320 formats the input as, for example, an XML file. The input can be in the form of changes made to the XML file (or portion thereof) originally received from the networked device 110. In other embodiments, the device communications module 320 also tracks states and events reported by the networked devices 320, or polls the networked devices 320 for a state.

The component repository 330 retrieves components responsive to the user interface information. The component type can be, for example, a button, a slider, a text box, a pop-up widow, a drop-down box, a graphics file, an animation, an audio file, and the like. The components can have names for instances or templates of the component type. The component repository 330 can be populated with basic components stored locally, and enhanced with, for example, components from Internet repositories or user-defined components.

The user interface module 340 outputs a user interface and receive user input. The user interface module 340 generates a user interface for presentation to the user. The user interface module 340 can use a template that is populated by components specified by the networked device 110. The user can interact with the components to control devices. In one embodiment, the user interface module 340 presents the networked device 110 as an icon within a floor layout as described herein.

III. Operation of the System

Figure 4:
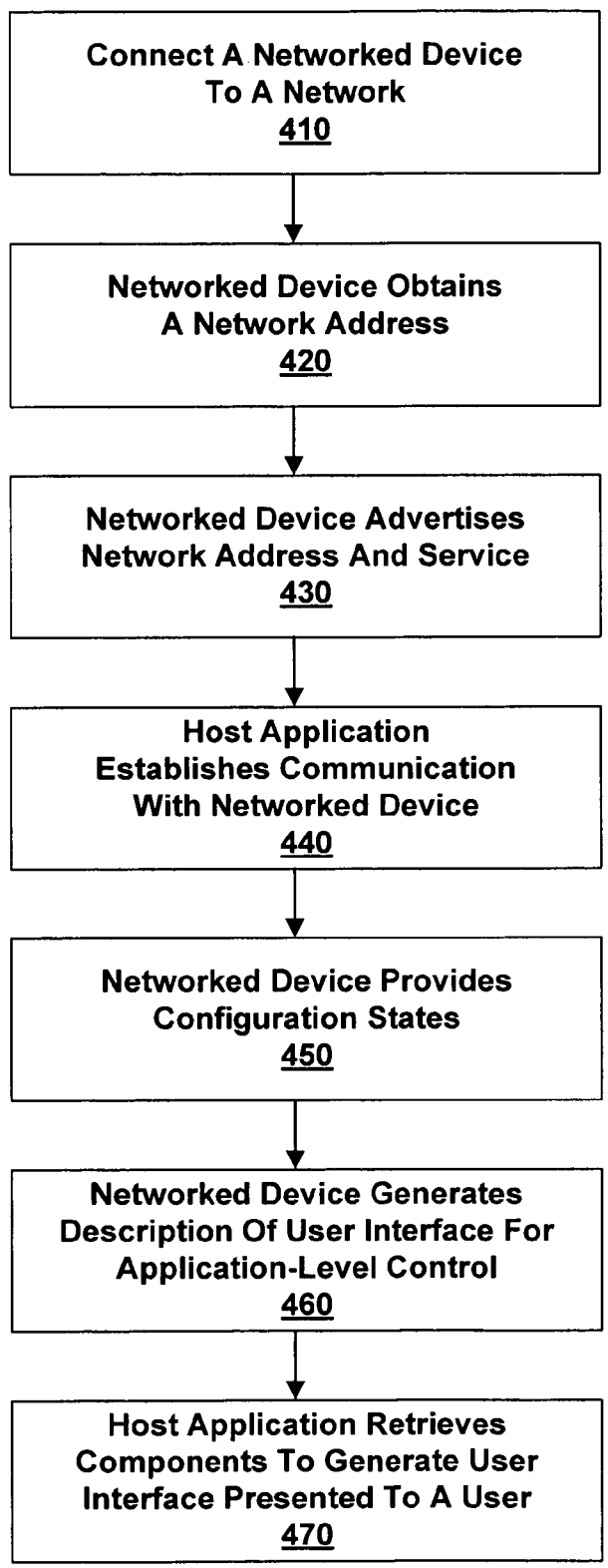
FIG. 4 is a flowchart illustrating a method for managing and controlling networked devices according to one embodiment of the present invention.

FIG. 4 is a flowchart illustrating a method 400 for managing and controlling networked devices according to one embodiment of the present invention. The system 100 connects 410 a networked device 110 to a network 410. For example, after a power up, the networked device 110 can sense available networks, or it can search for a network to which the networked device 110 was previously connected.

The networked device 110 obtains 420 a network address. The networked device 110 can request the network address in response to an event such as power up, reset, reboot, disconnection, network failure, or another circumstance causing the networked device 110 to be without a network address. In one embodiment, the networked device 110 can use a DHCP server 115, a DNS server, or other centralized device. In another embodiment, the networked device 110 can rely on Zeroconf, UPnP, or the like and other identifications, such as a MAC number, a serial number, or other unique identification.

The networked device 110 advertises 430 the network address (or other unique identifier) and a description of services. Advertising on the network 199 can be implemented using a broadcast or multicast network address, or range of addresses.

The host application 120 establishes 440 communication with the networked device 110. The host application 120 listens for advertising on a predetermined address. Once the host application 120 detects the advertisement, the network address and description of service is stored in memory for future communication. In another embodiment, the host application 120 can poll the network 199 for networked devices 110 generally that provide a needed service.

The networked device 110 provides 450 configuration states. The configuration states provide a low-level status as described above. The host application 120 can track the configuration states of each of the networked devices 110. For example, the host application 120 can use an availability state when generating a list of available networked devices 110 for the user. In another example, a home weather station can be polled for states such as temperature, humidity, and the like, every minute.

The networked device 110 generates 460 a description of a user interface for application-level control of the networked device 110. The corresponding user interface information, described above, can select from various tabbed views, indicate a number of tabs, assign names to the tabs, and select user interface components. In one embodiment, the user interface information can also describe a layout and alignment within the tab. In another embodiment, the host application 120 can provide layout and alignment.

Figure 6A:
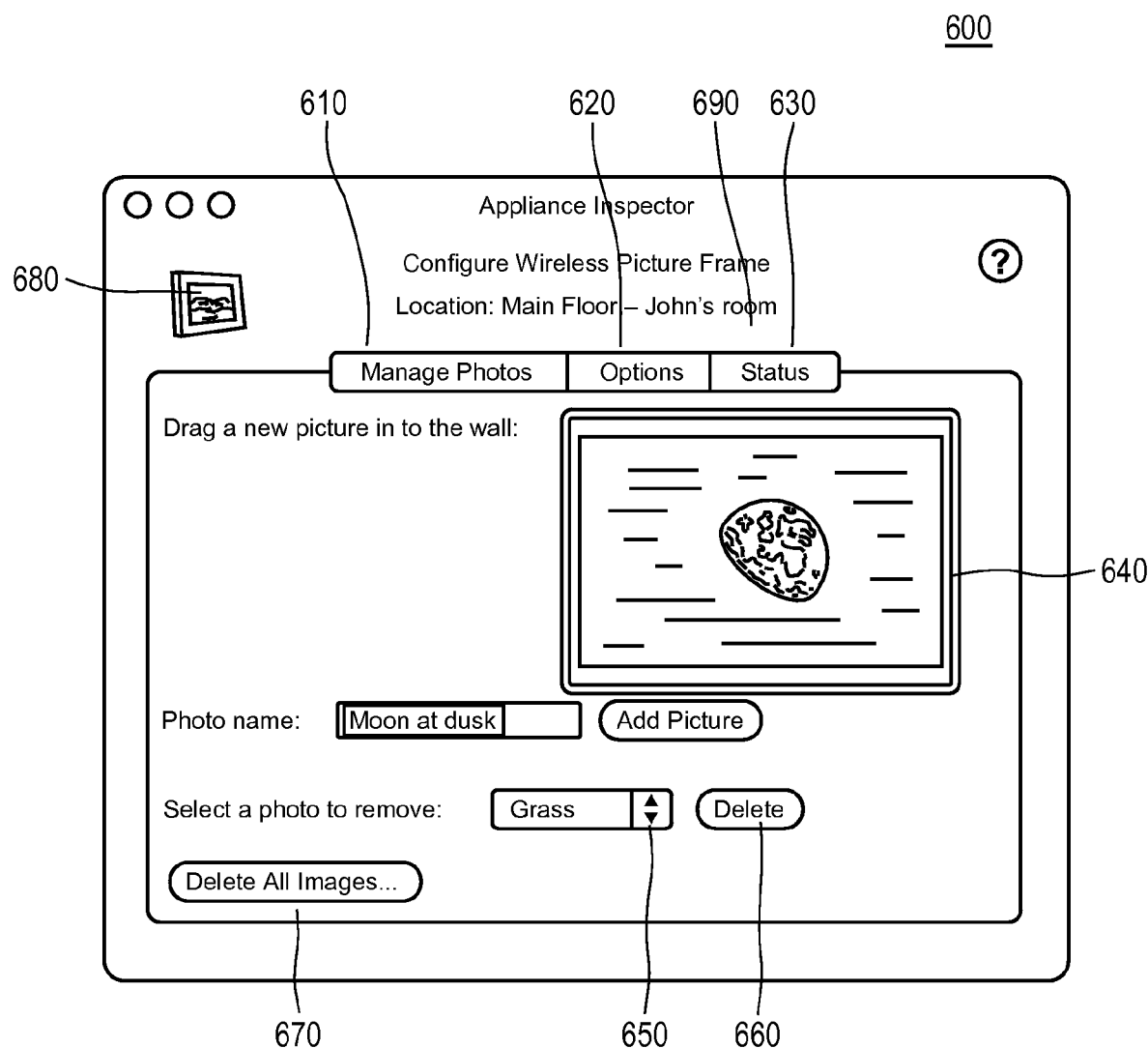
FIGS. 6A-B are schematic diagrams illustrating examples of user interfaces in accordance with embodiments of the present invention.
Figure 6B:
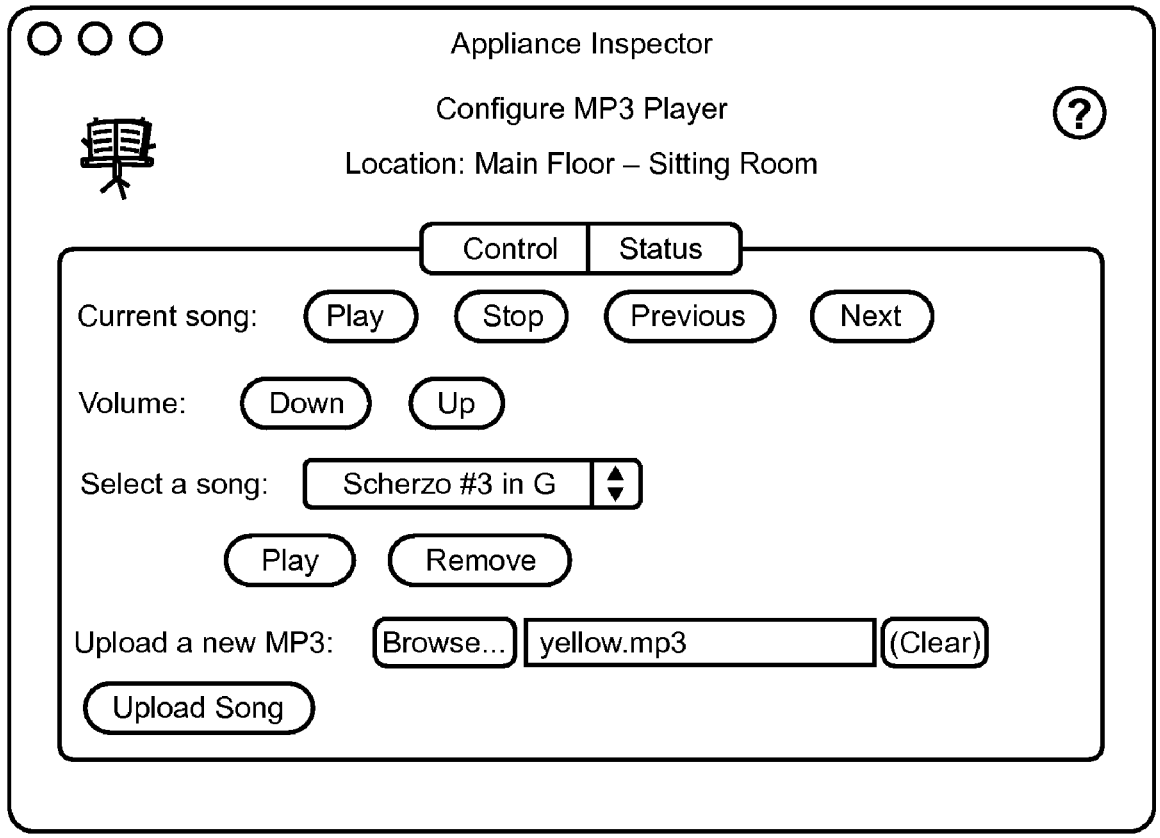
Figure 6B:
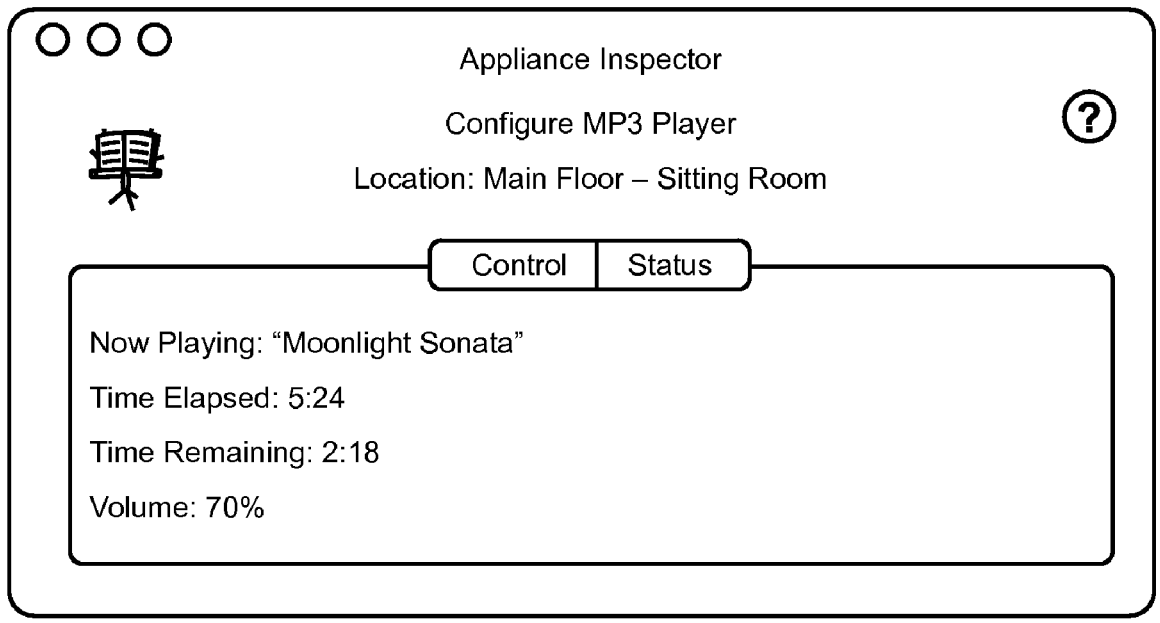

The tabs provide a common template that has a uniform look and feel across different networked devices 110. The user interface components populate each tab for control over custom services provided by the networked device 110. Example tabs for a digital picture frame 600 are shown in FIG. 6A. The tabs include a Manage Photos tab 610, an Options tab 620, and a Status tab 630. The active tab is the Manage Photos tab 610 which includes several user interface components. A picture well 640 is for dragging new pictures to download to the digital picture frame 600. A pop up menu 650 contains titles of stored images. Two buttons, a Delete button 660 and a Delete All Images button 670, provide management of stored images. An icon 680 is representative of the digital picture frame 600, as shown in the floor layouts. A location status 690 can be provided by a user when configuring the digital picture frame within the floor layout. Another example of tabs and user interface components is illustrated in a user interface 695 for an MP3 player in FIG. 6B.

The user interface information specifying the user interface can be formatted as an XML file as described above. The XML file includes two dictionaries, a description and an interface. The description dictionary specifies general properties of the appliance (e.g., a string displayed when the help button is pressed, TIFF data for the icon, the manufacturer, model name, etc. The interface dictionary describes tab views and their contents. Code in XML can include data types such as strings, integers, floats, arbitrary data, and the like. The data can be described in ordered arrays (i.e., <array> tag) or in key-pair dictionaries (i.e., <dict> tag).

Figure 11A:
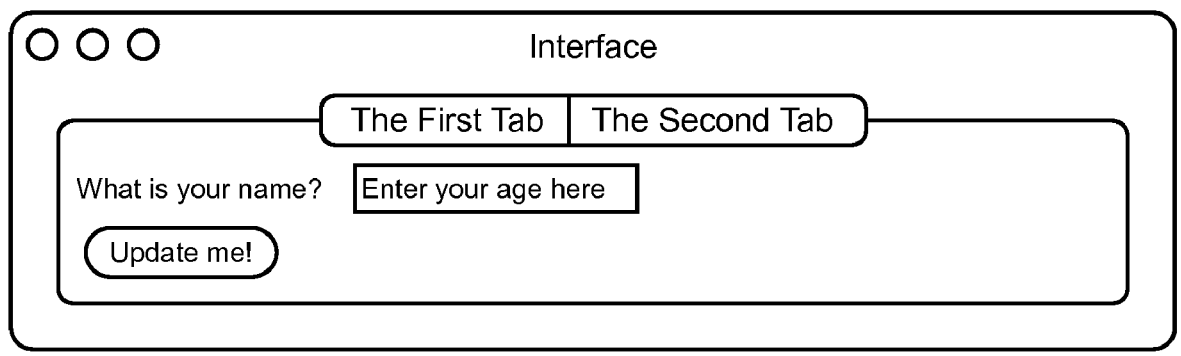
FIGS. 11A-B are schematic diagrams illustrating two examples of user interfaces resulting from XML code in accordance with embodiments of the present invention.

An example of XML code for the user interface illustrated in FIG. 11A is as follows:

```
<?xml version="1.0" encoding="UTF-8"?>
<!DOCTYPE plist PUBLIC "-//Apple Computer//DTD PLIST 1.0//EN" "http://www.apple.com/DTDs/Property List-1.0.dtd">
<plist version="1.0"
<dict>
  <key>description</key>
  <dict>
  <key>help</key>
  <string>If you need help, read the manual!</string>
  <key>icon</key>
  <data>TU0AKgAAaFaAACBQOCQWDQeEQmFQu
     GQ2HQ+I</data>
  <key>manufacturer</key>
  <string>WHOAMI devices</string>
  <key>model</key>
  <string>New Wireless Demo Appliance</string>
  <key>reloadTime</key>
  <float>5.0</float>
  </dict>
  <key>interface</key>
  <dict>
  <key>The First Tab</key>
  <array>
    <dict>
      <key>type</key>
      <string>text</key>
      <key>label</key>
      <string>What is your name?</string>
    </dict>
    <dict>
      <key>type</key>
      <string>textField</key>
      <key>name</key>
      <string>theName</key>
      <key>label</key>
      <string>Enter your age here</string>
    </dict>
    <dict>
      <key>type</key>
      <string>newLine</key>
    </dict>
    <dict>
      <key>type</key>
      <string>button</key>
      <key>label</key>
      <string>Update me!</string>
    </dict>
  </array>
  <key>The Second Tab</key>
  <array>
    <dict>
      <key>type</key>
      <string>text</key>
      <key>label</key>
      <string>Nothing to see here . . . </string>
    </dict>
  </array>
  <key>order</key>
  <array>
    <string>The First Tab</string>
    <string>The Second Tab</string>
  </array>
  </dict>
</dict>
```

The host application 120 retrieves 470 components to generate a user interface presented to the user. The component repository 330 or other data source can be searched using the user interface component name and/or type. FIGS. 9A-H are schematic diagrams illustrating examples of user interface components. More specifically, FIG. 9A shows a non-editable string; FIG. 9B shows an editable text field; FIG. 9C shows a push-button; FIG. 9D shows a horizontal slider, FIG. 9E shows a picture well; FIG. 9F shows a checkbox that can be on or off; FIG. 9G shows a pop up menu containing an arbitrary number of items; and, finally, FIG. 9H shows a browse button, an uneditable text field for a file name, and a clear button. Of course, the above-listed user interface components are merely exemplary and, thus, additional user interface components not listed can be within the scope and spirit of the present invention.

In response to the user interacting with one of the user interface components, the host application 120 sends an XML field describing the contents of the tab view from which the interaction occurred, along with a label of the user interface component.

Referring to the example of FIG. 11A, XML code resulting from the user typing in a name of "Fred" can result in the following code being sent from the host application 120 to the networked device 110:

```
<!DOCTYPE plist PUBLIC "-//Apple Computer//DTD PLIST 1.0//EN" "http://www.apple.com/DTDs/Property List-1.0.dtd">
<plist version="1.0"
<dict>
  <key>BUTTON</key>
  <string>Update Me!</string>
  <key>TAB</key>
  <string>The First Tab</string>
  <key>theName</key>
  <string>Fred</string>
</dict>
</plist>
```

Figure 11B:
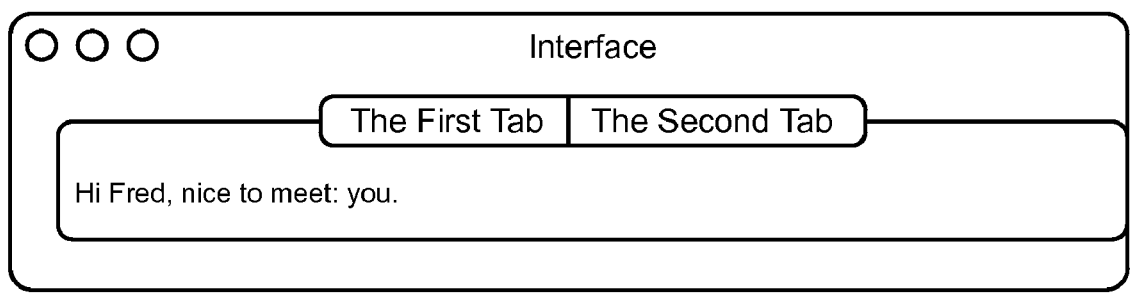

Upon receiving the code, the networked device 110 can update its settings and send back updated user interface information for the tab in which the interaction occurred. In one example, when the user interface is configured to acknowledge the person's name as shown in FIG. 11B, the host application 120 can send the following XML code to the networked device 110:

<!DOCTYPE plist PUBLIC "-//Apple Computer//DTD PLIST 1.0//EN" "http://www.apple.com/DTDs/PropertyList-1.0.dtd">

<plist version="1.0"

<dict>
   <key>BUTTON</key>
   <string>Update Me!</string>
   <key>TAB</key>
   <string>The First Tab</string>
   <key>theName</key>
   <string>Fred</string>

</dict>

</plist>

Optionally, a floor layout can be provided an additional level of abstraction and integration. The floor layout can display icons of various networked devices 110 at different locations around a home or business. In other embodiments, networked devices 110 can be grouped according to functionality or services, location, or other user-defined parameters. The user can interact with the icons with a mouse by dragging and dropping, double clicking, pressing a touch screen, and the like. For example, the user can select a device for application-level input.

Figure 7:
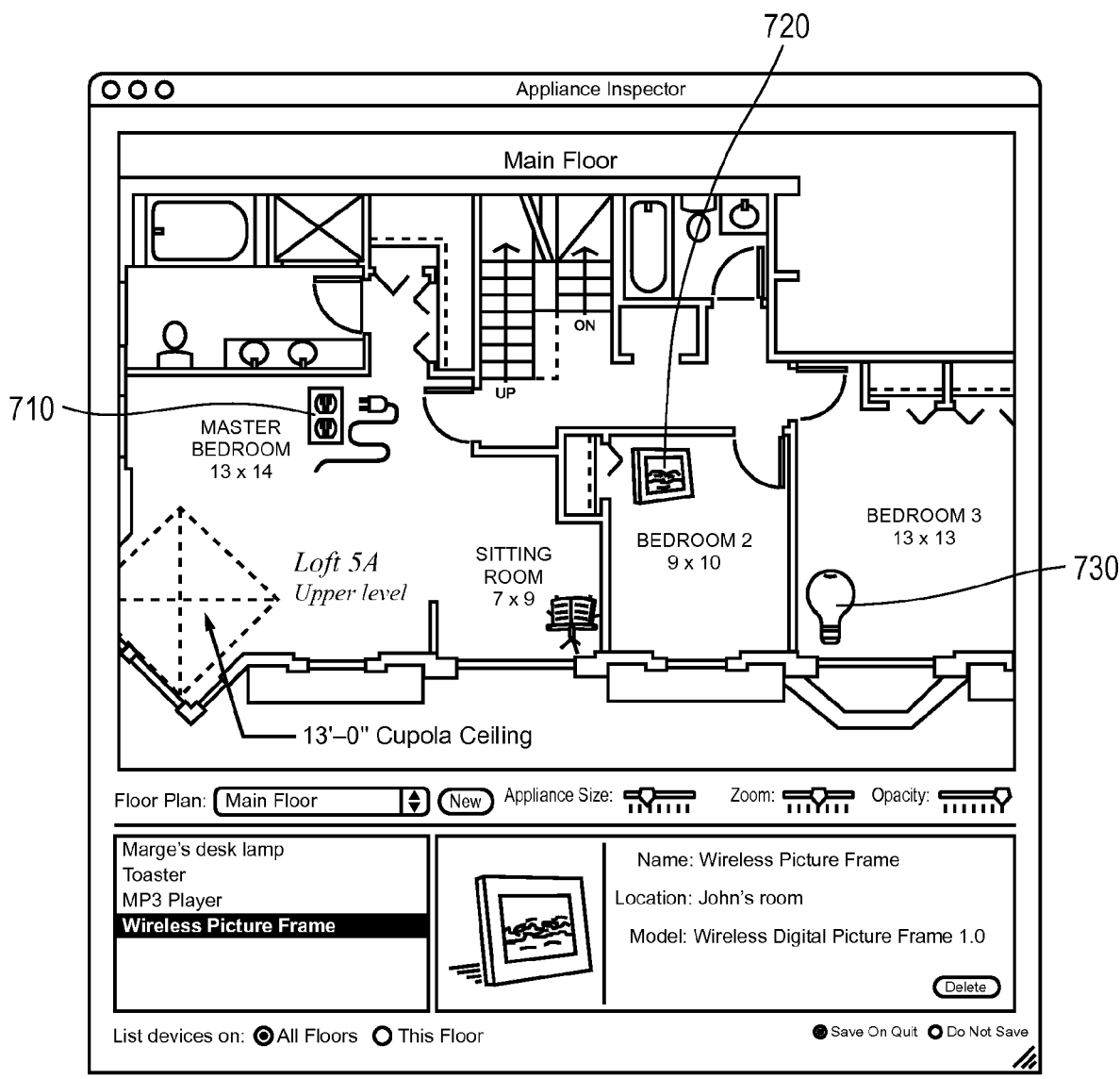
FIG. 7 is a schematic diagram illustrating an example of a user interface including a floor plan and icons in accordance with one embodiment of the present invention.

FIG. 7 is a schematic diagram illustrating an example a user interface 700 including a floor plan and icons according to one embodiment to the present invention. The user interface 700 shows several icons 710-730 that are representative of networked devices 110. A first icon 710 represents an outlet in the Master Bedroom which power can be controlled with electrical-signals. A second icon 720 represents a digital picture frame in Bedroom 2 which can have pictures downloaded or uploaded, be turned on or off, have a rotation of photos altered, and the like. A third icon 730 represents a light circuit (e.g., as shown in FIG. 10) in Bedroom 3 which allows lights to be turned on, off, dimmed, timed, and the like.

In other embodiments, the user interface 700 can contain a list of floors, each which has its own background. Icons can be scaled in accordance with an aspect ratio when the user interface 700 is resized.

Figure 8A:
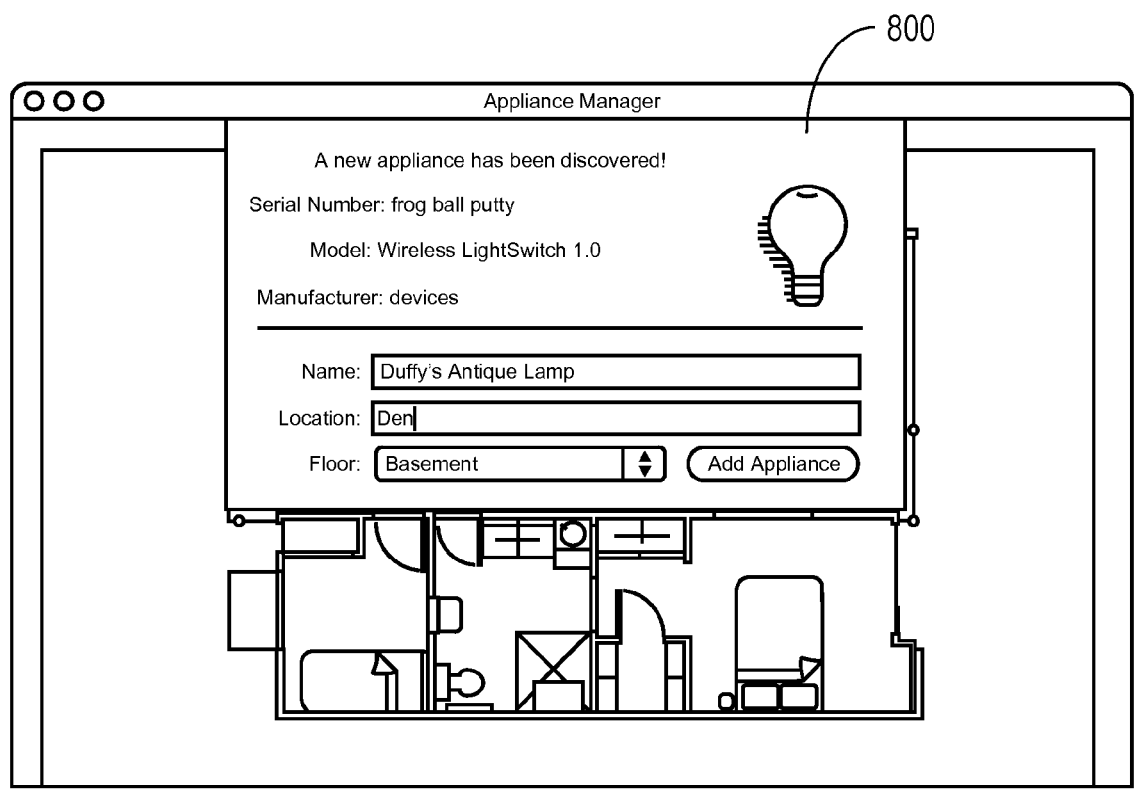
FIGS. 8A-B are schematic diagrams illustrating an example of control and management of networked devices in a user interface including a floor plan in accordance with one embodiment of the present invention.

In one embodiment, as shown in FIG. 8A, when a new networked device 110 is discovered, an alert sheet 800 can be presented with an icon and serial number of the appliance. The user can add a name. Once the networked device 110 has been added, double clicking on its icon can bring up an auxiliary window for configuration.

Figure 8B:
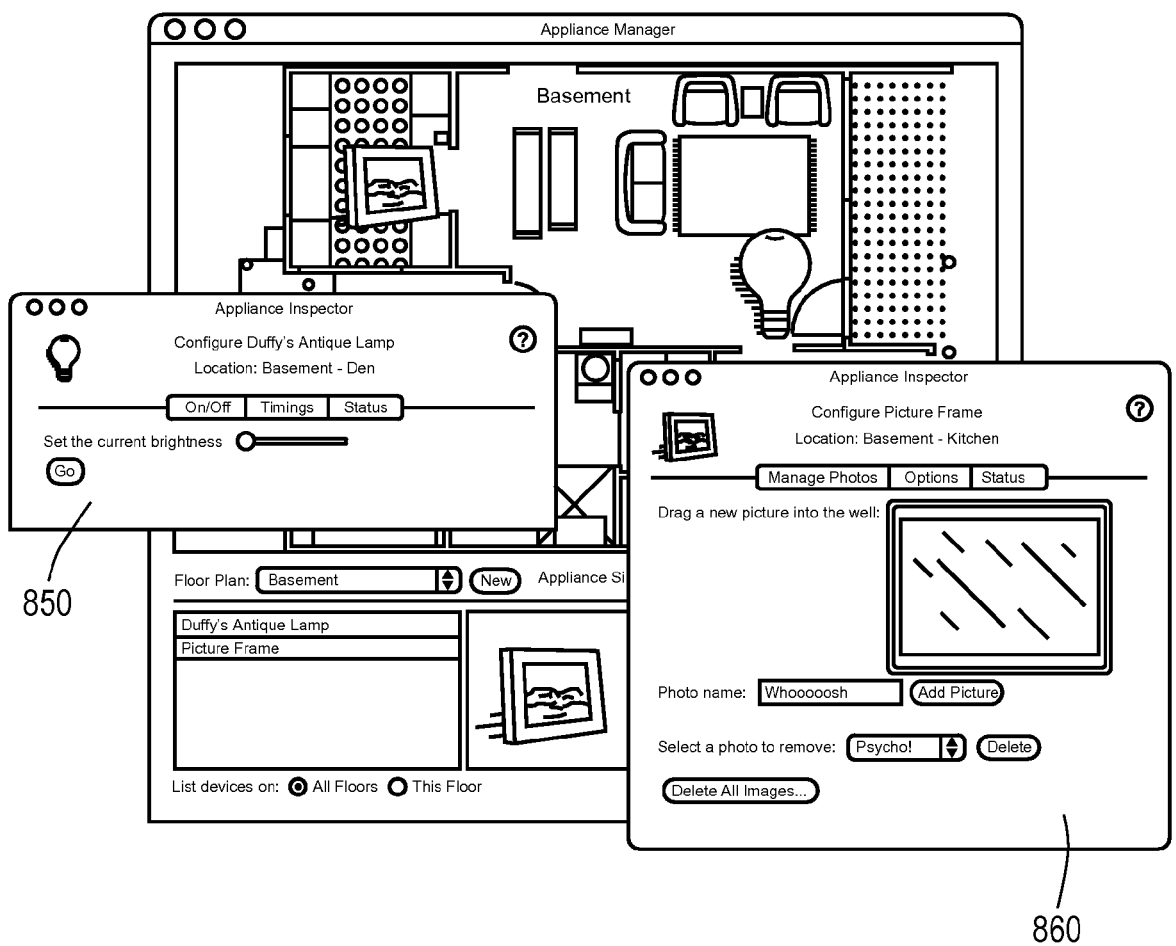

In still another embodiment, as shown in FIG. 8B, a user can interact with multiple networked devices 110 at the same time. User interfaces for a light circuit 850 and a digital picture frame 860 are cascaded over the floor plan.

Figure 5:
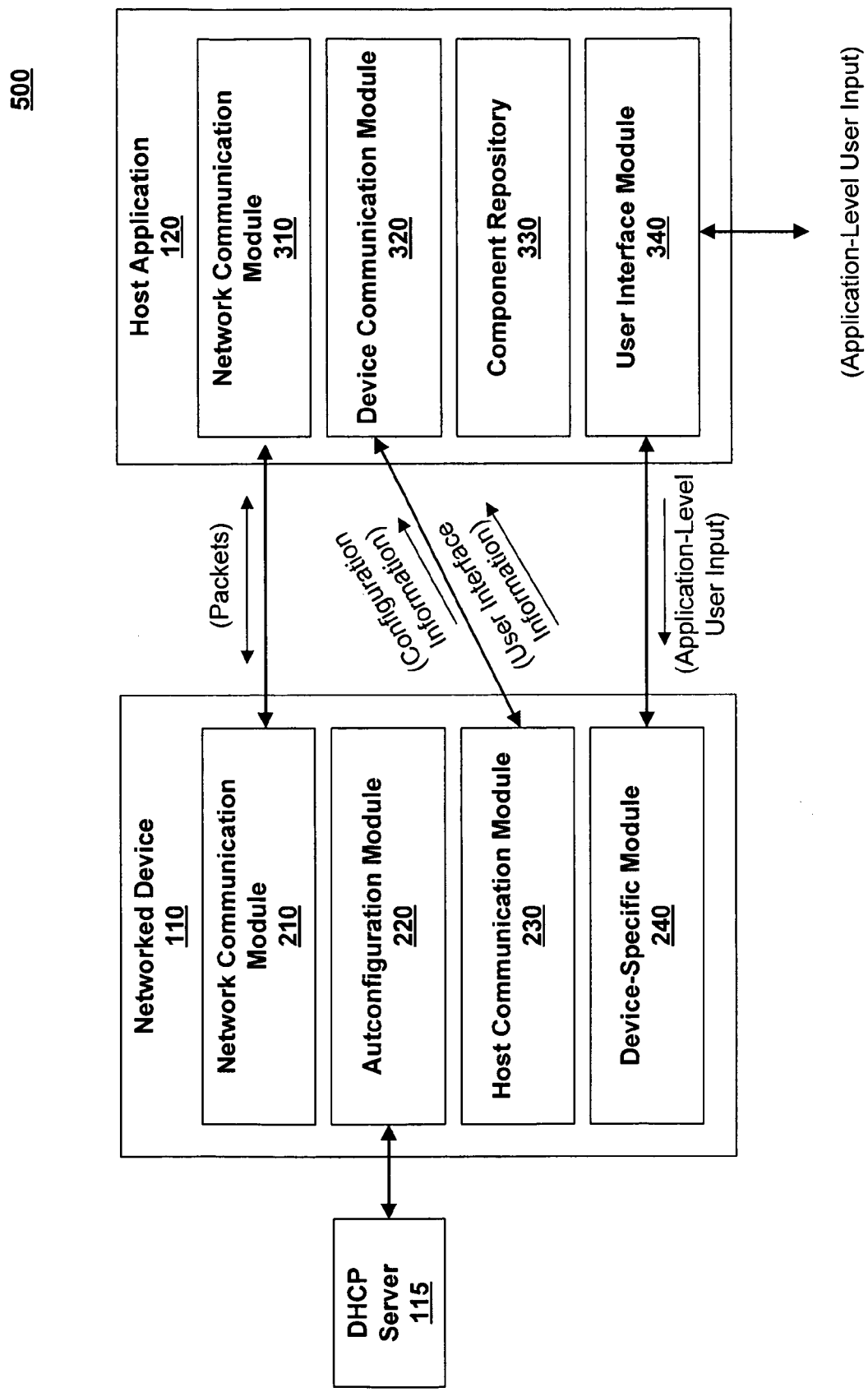
FIG. 5 is a schematic diagram illustrating layers of communication between the networked device and the host application according to one embodiment of the present invention.

FIG. 5 is a schematic diagram illustrating layers of communication 500 between the networked device 110 and the host application 120 according to one embodiment of the present invention. The layers of communication are representative since ultimately a data stream is placed on the physical medium by the network communication modules 210, 310.

The network communication module 210 and the network communication module 310 exchange packets of data using a content-independent protocol (e.g., TCP/IP). The autoconfiguration module 220 can communicate with the DHCP server 115 to obtain a network address in some embodiments. The host communication module 230 sends configuration information to the device communication module 320. The configuration information can be of many formats due to its simplicity (e.g., binary data or flag to represent on or off). By contrast, the host communication module 230 also sends user interface information to the device communication module 320 which is more data rich, and thus, uses a more appropriate format such as an XML file. The user interface module 340 sends application-level user input receives from the user to the device-specific module 240 packaged, for example, in the XML file.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A computer-implemented method for managing and controlling network appliances, comprising:
   receiving, from a networked device, a connection request;
   automatically establishing network communication with the networked device responsive to the connection request;
   displaying a graphical representation of an environment containing the networked device and a plurality of other networked devices, wherein a networked device is represented by an icon indicating the location of the networked device around the environment;
   receiving, from the networked device, user interface information that specifies user interface components related to a service provided by the networked device, the user interface components providing interactive control of the networked device; and
   generating a user interface responsive to the user interface information, and allowing interacting with a plurality of the user interface components and the icon.

2. The method of claim 1, wherein generating the user interface comprises:
   generating the user interface without prior configuration of the networked device.

3. The method of claim 1, further comprising:
   receiving, from a user, input corresponding to a user interface component; and
   sending, to the networked device, the input.

4. The method of claim 3, wherein sending the input comprises:
   sending, to the networked device, the user interface information including changes resulting from the input.

5. The method of claim 1, further comprising:
   receiving, from the networked device, updated user interface information that specifies user interface components based on changes to the networked device responsive to the input.

6. The method of claim 1, wherein receiving the user interface information comprises:
   receiving, from the networked device, an XML file that includes syntax for specifying a user interface component name and a user interface component value.

7. The method of claim 1, further comprising:
   receiving, from the networked device, state information that describes a condition associated with the networked device that is not directly due to interaction by a user.

8. The method of claim 1, wherein receiving the connection request comprises:
   receiving, from the networked device, the connection request broadcast over a network, the connection request including a network address and the service provided by the networked device.

9. A computer-implemented method for managing and controlling networked devices, comprising:
   automatically establishing network communication with a host application by sending a connection request that includes a network address and a service provided, wherein the network address and service identify a networked device;
   displaying a graphical representation of an environment containing the identified networked device and a plurality of other networked devices, wherein a networked device is represented by an icon indicating the location of the networked device around the environment;
   sending, to the host application, user interface information that specifies user interface components related to the service, the user interface components and the icon providing interactive control of the networked device;
   receiving, from the host application, input associated with a user interface component; and
   updating the user interface information in response to the input.

10. The method of claim 9, further comprising:
    sending, to the host application, the user interface information including changes to a user interface component responsive to the input.

11. The method of claim 9, further comprising:
    generating an XML file that includes syntax for specifying a user interface component name and a user interface component value.

12. The method of claim 9, wherein automatically establishing network communication comprises:
    automatically establishing network communication using the Zeroconf protocol.

13. The method of claim 9, wherein automatically establishing network communication comprises:
    automatically establishing network communication using the UPnP protocol.

14. A computer program product for managing and controlling networked devices, the computer program product comprising a computer-readable medium, the computer-readable medium comprising program code for performing a method, comprising:
    receiving, from a networked appliance, a connection request;
    automatically establishing network communication with a networked device responsive to the connection request;
    displaying a graphical representation of an environment containing the networked device and a plurality of other networked devices, wherein a networked device is represented by an icon indicating the location of the networked device around the environment;

receiving, from the networked appliance, user interface information that specifies user interface components related to a service provided by the networked device, the user interface components providing interactive control of the networked device; and generating a user interface responsive to the user interface information, and allowing interacting with a plurality of the user interface components and the icon.

15. A system for managing and controlling networked devices, comprising:

a networked device to broadcast a connection request including the network address and a description of a service provided by the networked device, and to generate user interface information that specifies user interface components related to the service provided by the networked device, the user interface components providing interactive control of the networked device; and a host application, in communication with the networked device, the host application configured to automatically establish network communication with a networked device responsive to the connection request, to display a graphical representation of an environment containing the networked device and a plurality of other networked devices, a networked device being represented by an icon indicating the location of the networked device around the environment, and to generate a user interface responsive to the user interface information, and allowing interacting with a plurality of the user interface components and the icon.

16. The system of claim 15, wherein the networked device comprises a consumer appliance.

17. The system of claim 15, wherein the networked device comprises a digital device.

18. The system of claim 15, wherein the networked device comprises an electronically-controllable device.

19. The system of claim 15, wherein the host application is configured to execute on a personal computer or a laptop computer.

20. The system of claim 15, wherein the host application is configured to execute on PDA device.

21. The system of claim 15, wherein the host application is configured to execute on a remote control device.

22. The system of claim 15, wherein the user interface components comprise one or more from the group containing: a text field, a button, a slider, a picture well, a checkbox, a pop up box, and a drop down menu.

23. The system of claim 15, wherein the host application is in communication with the networked device via IEEE 802.11.

24. The method of claim 1, wherein generating a user interface comprises using a template that has a consistent appearance of control elements across different networked devices.

25. The method of claim 9, wherein updating the user interface information comprises updating settings of the network device.

26. The method of claim 9, wherein updating the user interface information further comprises sending back to the host application updated user interface information.

27. The method of claim 1, wherein the graphical representation of the environment is a floor plan comprising a plurality of icons, each of which represents a networked device and allows interactive control of the networked device.

28. The method of claim 1, wherein the graphical representation of the environment comprises a list of floor plans, each of which has a background and a plurality of icons.

29. The method of claim 1, wherein the icon associated with the networked device is scaled in accordance with an aspect ratio responsive to the graphical representation of the environment being resized.

* * * * *

UNITED STATES PATENT AND TRADEMARK OFFICE
CERTIFICATE OF CORRECTION

PATENT NO. : 7,730,223 B1  
APPLICATION NO. : 11/195586  
DATED : June 1, 2010  
INVENTOR(S) : Clay Bavor et al.

Page 1 of 1

It is certified that error appears in the above-identified patent and that said Letters Patent is hereby corrected as shown below:

In Drawings

On Sheet 2 of 14, in Figure 2, in Reference Numeral 220, line 1, delete "Autconfiguration" and insert -- Autoconfiguration --, therefor.

On Sheet 5 of 14, in Figure 5, in Reference Numeral 220, line 1, delete "Autconfiguration" and insert -- Autoconfiguration --, therefor.

Signed and Sealed this
Eighth Day of November, 2011

David J. Kappos
*Director of the United States Patent and Trademark Office*